(12) United States Patent
Gamo

(10) Patent No.: US 6,832,257 B1
(45) Date of Patent: Dec. 14, 2004

(54) COMPUTER, RECORDED MEDIUM ON WHICH ADDRESS VALIDITY CHECKING PROGRAM IS RECORDED, AND ADDRESS VALIDITY CHECKING METHOD

(75) Inventor: Tsutomu Gamo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/601,563

(22) PCT Filed: Dec. 7, 1999

(86) PCT No.: PCT/JP99/06856

§ 371 (c)(1),
(2), (4) Date: Sep. 6, 2000

(87) PCT Pub. No.: WO00/34871

PCT Pub. Date: Jun. 15, 2000

(30) Foreign Application Priority Data

Dec. 7, 1998 (JP) .......................................... 10-346865

(51) Int. Cl.[7] .............................................. G06F 15/16
(52) U.S. Cl. ...................... 709/229; 711/163; 711/164; 711/166; 711/200
(58) Field of Search ......................... 709/229; 711/163, 711/164, 166, 200

(56) References Cited

U.S. PATENT DOCUMENTS 5,742,826 A    4/1998  Endicott et al.
6,021,476 A  * 2/2000  Segars ......................... 711/163
6,101,586 A  * 8/2000  Ishimoto et al. ............. 711/163
6,377,977 B1 * 4/2002  Sakata ......................... 709/205
6,493,816 B1 * 12/2002 Munroe et al. .............. 711/209
6,496,934 B2 * 12/2002 Suzuki et al. ................ 713/200

FOREIGN PATENT DOCUMENTS

| JP | 1-180656 | 7/1989 |
| JP | 7-6095   | 1/1995 |
| JP | 8-212139 | 8/1996 |

* cited by examiner

*Primary Examiner*—John Follansbee
*Assistant Examiner*—Jinsong Hu
(74) *Attorney, Agent, or Firm*—Frommer Lawrence & Haug LLP; William S. Frommer; Darren M. Simon

(57) ABSTRACT

When a request processing unit 2a receives processing request including memory access, it executes processing in accordance with the request, and when memory access takes place, it outputs access request to address designated by the processing request. A memory access proxy unit 2b sets memory protection information 1a of object 1 at a memory management unit 3a to output memory access instruction to a processor 3. The memory management unit 3a generates exception when memory access instruction from the memory access proxy unit 2b is access except for area set as memory protection information 1a. Thus, it is possible to carry out, at high speed, with high reliability, memory access such that, in accordance with request of an object, other object executes.

7 Claims, 15 Drawing Sheets

FIG. 14

COMPUTER, RECORDED MEDIUM ON WHICH ADDRESS VALIDITY CHECKING PROGRAM IS RECORDED, AND ADDRESS VALIDITY CHECKING METHOD

TECHNICAL FIELD

This invention relate; to a computer having memory protection function, a computer readable recording medium adapted so that address validity collation program is recorded, and an address validity collation method at such a computer, and more particularly to a computer having function in which, in response to request of an object, other object provides memory access, a computer readable recording medium adapted so that address validity collation program executed at such a computer is recorded, and an address validity collation method at such a computer.

BACKGROUND ART

In order to execute program on the computer, it is necessary to protect memory by any means. For example, there are instances where object executed on the computer may intentionally or resultantly issue invalid or inaccurate access request with respect to memory area except for address area permitted with respect to the own object during its execution. Here, it is preferable that object is parallel object referred to in the U.S. patent application Ser. No. 08/678,288 U.S. Pat. No. 6,138,140, in which the invention by the same applicant as this applicant is described. Parallel object is execution unit of process, and is such an object capable of carrying out processing in parallel to other parallel object. In order to maintain stable operation of security or the system, it is necessary to exclude access to invalid address area. In view of the above, in many operating systems, memory protection is realized by utilizing memory management system of processor.

Explanation will now be given in connection with processing of memory protection when access to invalid address area takes place.

FIG. 1 is a block diagram for explaining conventional memory protective operation. Operating system 110 carries out context switch in starting execution of object 101 and sets memory protection information that corresponding object 101 has at memory management system 121 of processor 120. Further, accesses from the object 101 to memory 102 are carried out all through the memory management system 121. In this instance, the memory management system 121 carries out check as to whether or not designated address infringes memory protection information set at present in the memory management system 121. As a result, in the case where there is no infringement, access to actual memory 102 is provided. On the other hand, in the case where there is any infringement, memory access is not carried out, but exception is generated by the memory management system 121. Information of that exception is notified to the operating system 110. The operating system 110 analyses exception phenomenon to provide exception processing service corresponding thereto.

In a manner as stated above, access only to a predetermined memory space can be provided from the object 101. Thus, memory is protected.

Moreover, there are also cases where object 101 carries out memory access through operating system 110. In such cases, collation relating to validity of address is carried out in the operating system 110. For example, the operating system 110 provides service for responding to request from object 101, e.g., system call or API (Application Programing Interface) and there are instances where address is delivered from object 101 at the time of such service request. Ordinarily, this address designates address area permitted for the object 101 and the operating system 110 provides access to such area to carry out service. The operation at this time will be described below.

FIG. 2 is a block diagram for explaining the operation of address collation by the operating system 110. When the operating system 110 receives service request including address from the object 101, it investigates or checks validity of address at address collation module 111 before it executes actual service at service processing object 112. This is necessary processing for the reason described below.

Ordinarily, the operating system 110 has access right with respect to address area of object 101 in addition to address area of the operating system 110 itself for the purpose of realizing service. For this reason, even in the case where address delivered from the object 101 inaccurately designates address area of the operating system 110, validity cannot be discriminated in memory management system 121 that processor 120 has so that access thereto can be provided. Accordingly, there arises the necessity to discriminate validity of address in advance.

Validity collation of address is ordinarily carried out by sequentially collating, by address collation module 111, whether or not address delivered infringes memory protection information that object 101 has. Collation result of address is delivered to service processing object 112. In the case where it is judged that its result is invalid (inaccurate) address, error is sent back to the, object 101 as service result.

However, when there is carried out memory access utilizing function that the operating system 110 provides by the above-described method, it is necessary to carry out validity collation of address at address collation module 111 before address delivered from object 101 is actually used in the operating system 110, giving rise to the problem that execution processing speed is lowered.

In addition, a method which dose does not collate validity of address is conceivable. In this case, however, since the case where address delivered from the object 101 designates destination of storage of data within the operating system 110, etc. cannot be checked, there arise the problems that data of the operating system 110 is broken and access is inaccurately provided.

As stated above, the conventional operating systems are required to necessarily carry out validity collation of address before address delivered from object is actually used. For this reason, when validity collation of address is carried out, there was the drawback that the execution speed is lowered in accordance with quantity of memory protective information.

DISCLOSURE OF THE INVENTION

This invention has been made in view of such circumstances, and its object is to provide a computer capable of carrying out, at high speed, with high reliability, memory access that, in accordance with request of an object, other object executes.

Another object of this invention is to provide a computer readable recording medium adapted so that there is recorded exception processing program for permitting the computer to carry out, at high speed, with high reliability, memory access that, in accordance with request of an object, other object executes.

A further object of this invention is to provide an exception processing method for executing, at high speed, with high reliability, memory access that, in accordance with request of an object, other objects executes.

In order to solve the above-described problems, the computer according to this invention is directed to a computer having a function to protect memory by permitting access only to address area designated by memory protection information, the computer comprising: request processing means adapted so that when it receives processing request including memory access to designated address, it executes processing in accordance with the processing request, and when memory access takes place, it outputs access request to address designated by processing request; memory access proxy (agent) means adapted to receive the access request that the request processing means outputs to set memory protection information in which area where object which has outputted processing request can access is caused to be accessible area to output, to processor, memory access instruction corresponding to the access request; and memory management means adapted so that when the memory access instruction that the memory access proxy (agent) means outputs is access except for area set in the memory protection information, it generates exception with respect to the memory access instruction.

In accordance with such a computer, when processing request including memory access to designated address is outputted, its processing request is received the by request processing means. Thus, processing in accordance with the request is executed. In this instance, when memory access takes place, access request to address designated by processing request is outputted by the request processing means. Thus, access request is received by the memory access proxy means. As a result, there is set memory protection information in which area that object which has outputted processing request can access is caused to be accessible area. In that state, by the memory access proxy means, memory access instruction corresponding to the access request is outputted to the processor. On the other hand, when memory access instruction that the memory access proxy means outputs is access except for area set in the memory protection information, exception with respect to the memory access instruction is caused to take place by the memory management means.

Further, in order to solve the above-described problems, the recording medium adapted so that address validity collation program is recorded according to this invention is directed to a computer readable recording medium adapted so that there is recorded address validity collation program executed by processor having such a memory management function that when memory access instruction is access except for area set in memory protection information, exception with respect to memory access instruction is caused to take place, wherein computer is caused to function as request processing means such that when it receives processing request including memory access to designated address, it executes processing: in accordance with the processing request, and when memory access takes place, it outputs access request to address designated by processing request, and memory access proxy (agent) means adapted to receive access request that the request processing means has outputted to set memory protection information in which area that object which has outputted processing request can access is caused to be accessible area to output, to the processor, memory access instruction in accordance with the access request.

When address validity collation program recorded with respect to such a recording medium is caused to be executed by computer, functions necessary for the above-described computer according to this invention are constructed.

In addition, in order to solve the above-described problems, the address validity collation method according to this invention is directed to an address validity collation method using processor having function to protect memory by permitting access only to address area designated by memory protection information, wherein when processing request including memory access to designated address is outputted, processing in accordance with the processing request is executed, and when memory access takes place during execution of processing request, memory protection information in which area that object which has outputted processing request can access is caused to be accessible area is set to output, to the processor, instruction for carrying out memory access taking place during execution of the processing request.

In accordance with the address validity collation method as stated above, when processing request including memory access to the designated address is outputted, its processing request is executed. When memory access takes place during execution, there is set memory protection information in which area that object which has outputted processing request can access is caused to be accessible. Thereafter, instruction for carrying out memory access is outputted to the processor.

BRIEF DESCRIPTION OF THE DRAWINGS

FIG. 14 is a view showing display picture of host debugger in the case where address is within the valid range when user operates variable display on the host debugger.

BEST MODE FOR CARRYING OUT THE INVENTION

Explanation will now be given with reference to the attached drawings in connection with computer, recording medium adapted so that address validity collation program is recorded, and address validity collation method according to this invention.

Figure 1:
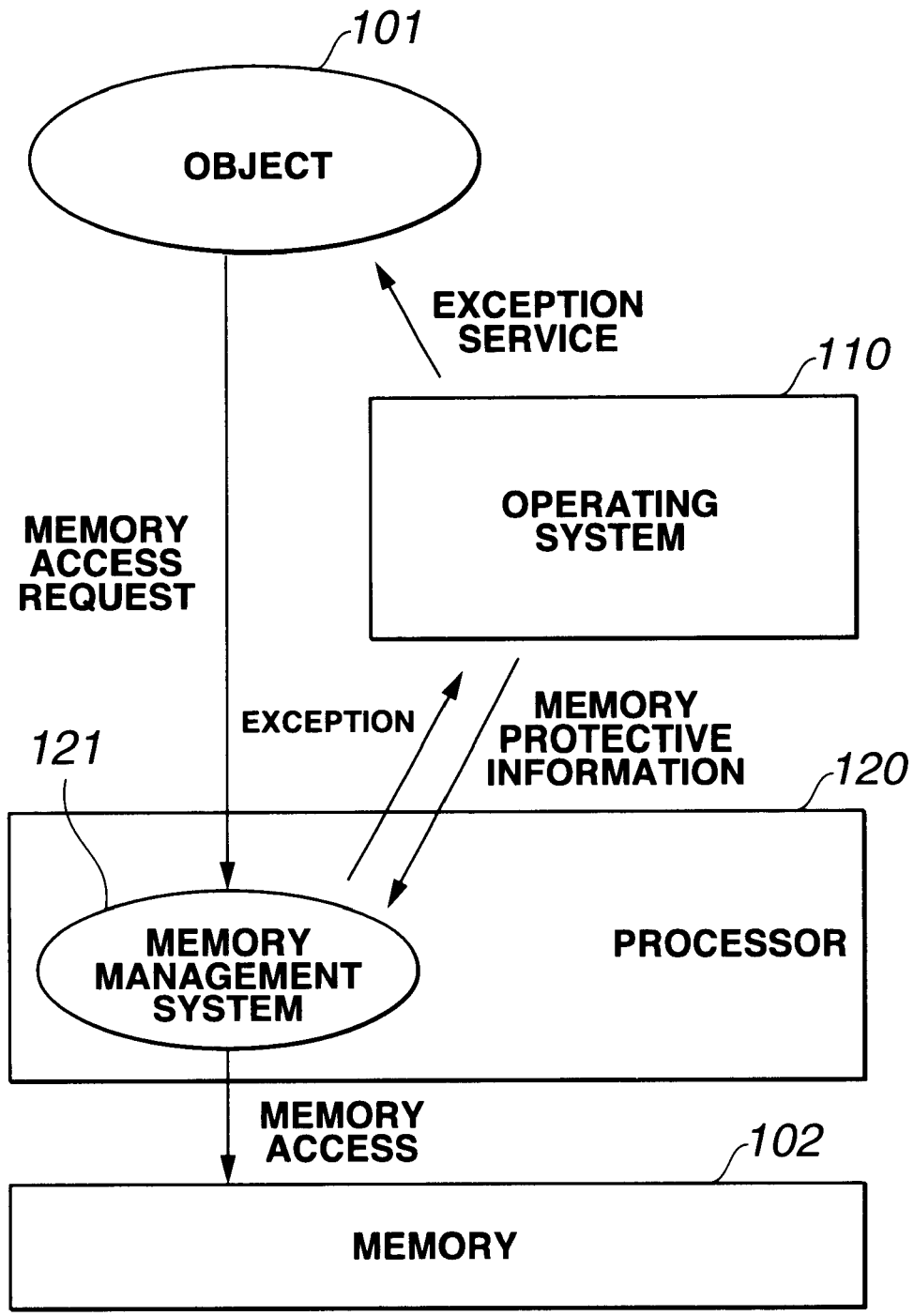
FIG. 1 is a block diagram for explaining conventional memory protection operation.
Figure 2:
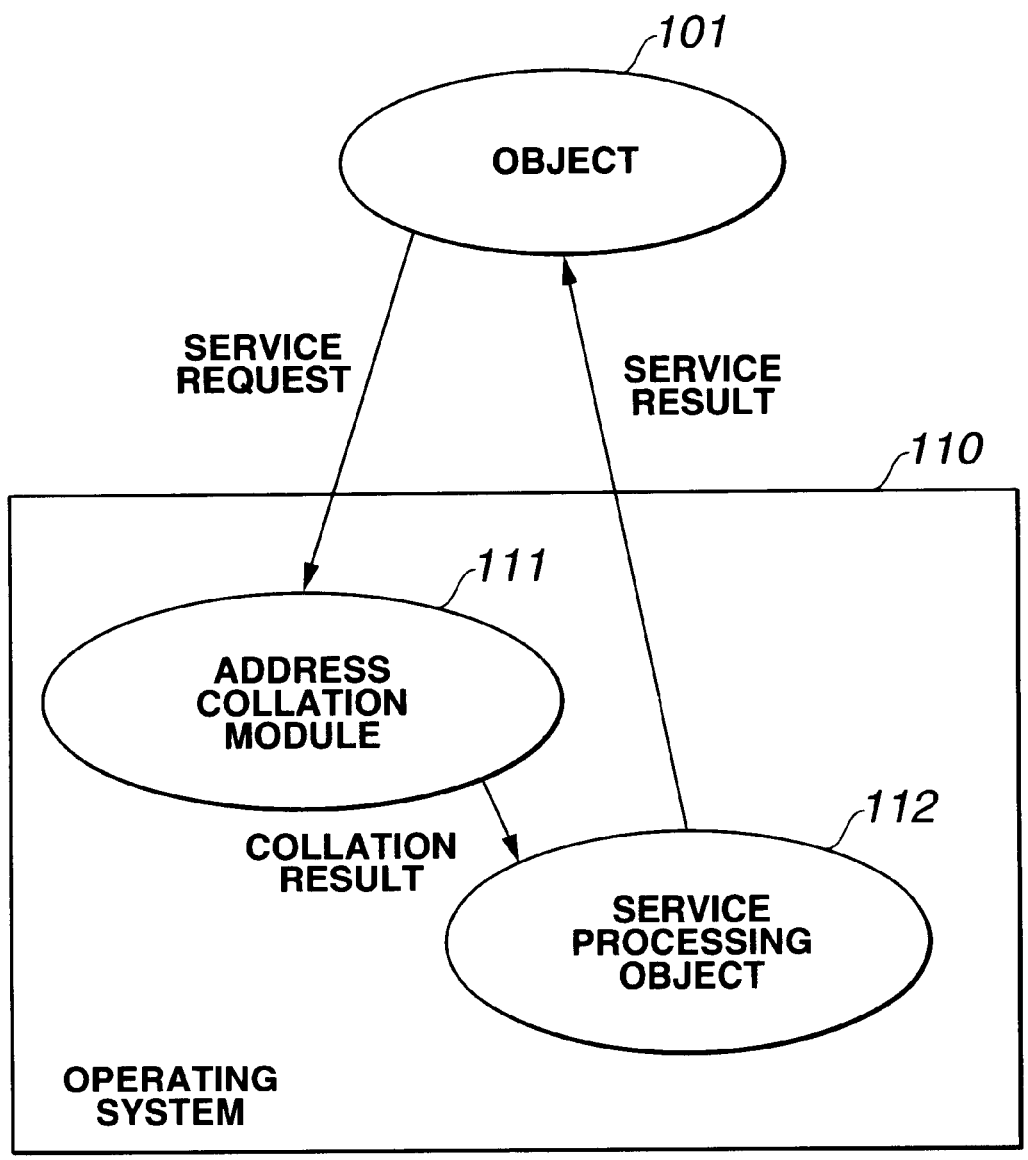
FIG. 2 is a block diagram for explaining operation of address collation by operating system.
Figure 3:
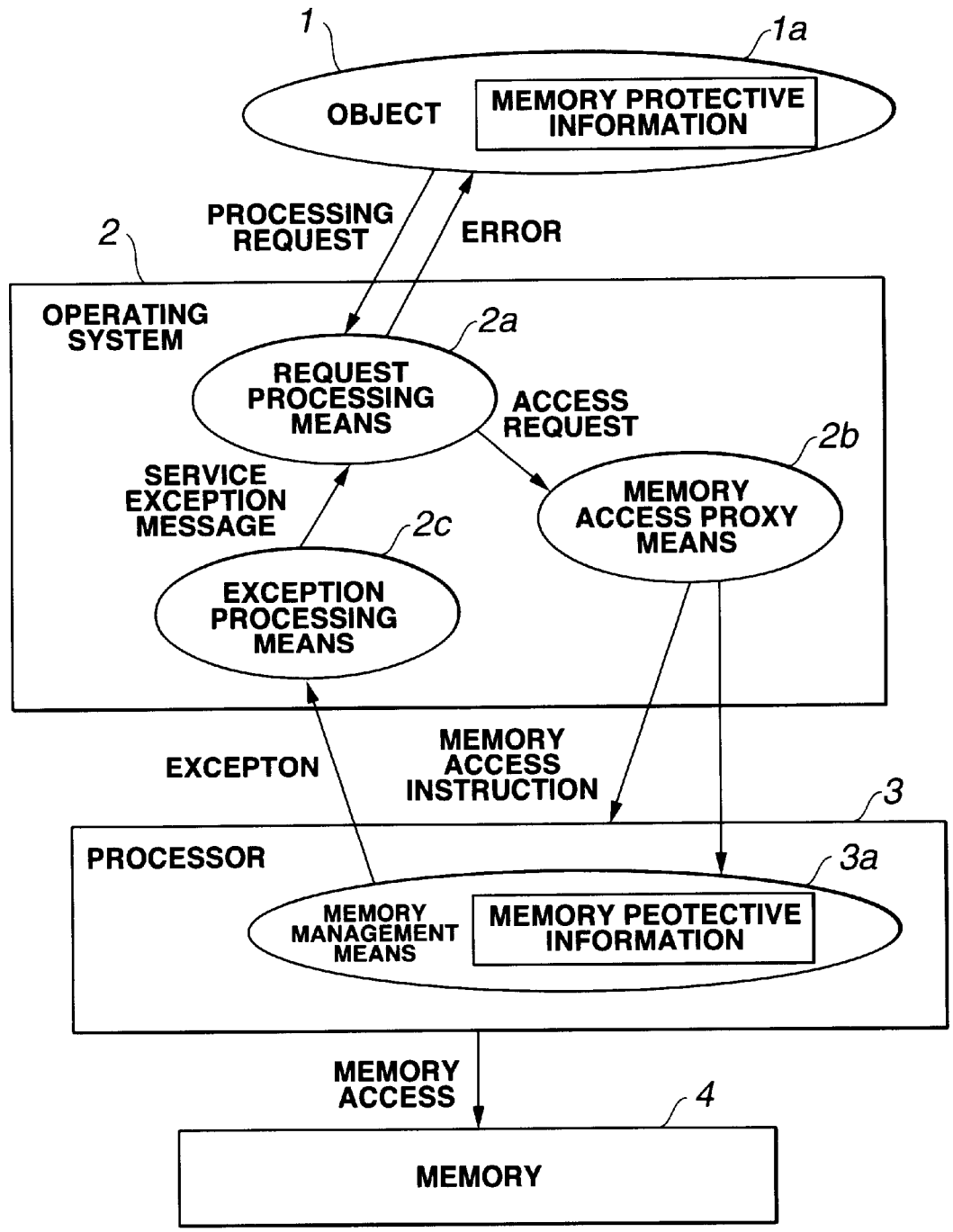
FIG. 3 is a block diagram for explaining the principle of this invention.

FIG. 3 is a block diagram for explaining the principle of this invention. In the computer according to this invention, when processing request including address is outputted from object 1, that processing request is sent to request processing means 2a within operating system 2. Thus, the request processing means 2a executes processing in accordance with the processing request. In the case where there is necessity of operation to use address during execution of processing, the request processing means 2a calls memory access proxy (agent) means 2b to deliver access request thereto to allow that means to carry out agent operation of memory access. The memory access proxy means 2b sets memory protection information 1a of the object 1 at memory management means 3a of processor 3. Further, in the state where it can be recognized by exception processing means 2c that memory access proxy means 2b is executing processing, the memory access proxy means 2b outputs memory access instruction to the processor 3.

The memory management means 3a of the processor 3 which has received memory access instruction judges as to whether or not access destination is within the area permitted by memory protective information 1a. When access destination designates valid or suitable address, the processor 3 provides access to memory 4 in accordance with instruction. On the other hand, when address designated by memory access instruction is invalid (inaccurate), the processor 3 generates exception phenomenon or event. Information to the effect that exception has taken place is delivered to exception processing means 2c of the operating system 2

The exception processing means 2c recognizes exception generated during execution of the memory access proxy (agent) means 2b. Further, the exception processing means 2c sends service exception message to the effect that access request has been caused to undergo exception completion to the request processing means 2a which has outputted access request to the memory access proxy means 2b. When the request processing means 2a receives service exception message, it sends service being processed as error back to the object.

In accordance with the computer having such a function, it becomes unnecessary to carry out processing to sequentially collate as to whether or not designated address infringes memory protection information that object by address collation module has before address included in service request message is used as has been conventionally carried out. In place of such a processing, memory access processing is carried out by the memory access proxy means 2b. In that instance, memory protective information 1a of object 1 which has outputted processing request is set at memory management means 3a of the processor 3, thereby excluding invalid (inaccurate) memory access. Accordingly, processing at the address collation module which was conventionally required becomes unnecessary. Thus, the processing in the case where valid address is delivered can be carried out at high speed.

It is to be noted that while, in the above-described explanation, the function that object 1 or operating system 2 has and the function of the processor 3 are separately represented, the function of the object 1 or the operating system 2 is in practice function realized by executing, by means of the processor 3, program in which processing content of its function is described. In addition, the function explained as function of the processor 3 is the function that the processor 3 itself has from a viewpoint of hardware. The facts as described above are the same in the following description.

A more practical example where this invention is applied to a computer system constructed on the basis of object oriented (directed) concept will now be described below.

Figure 4:
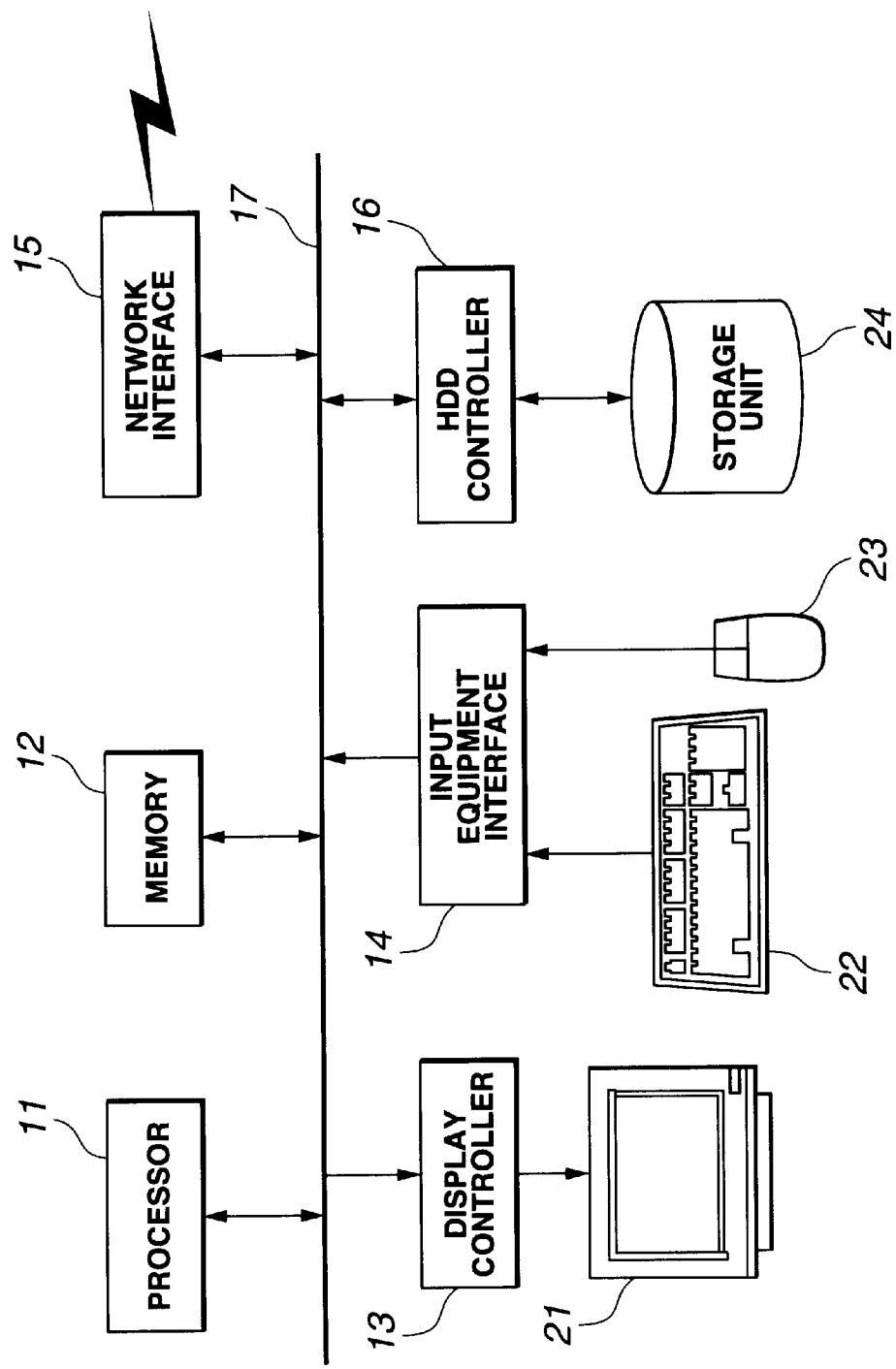
FIG. 4 is a block diagram showing hardware configuration of computer for carrying out this invention.

FIG. 4 is a block diagram showing hardware configuration of the computer for carrying out this invention. This system is constituted with a processor 11 being as center. The processor 11 has functions to execute various processing on the basis of program stored in a memory 12 and to generate exception in the case where access request with respect to invalid address area is made. In addition, the processor 11 controls various equipments connected through a bus 17. Peripheral equipments connected to the bus 17 are mentioned below.

A display controller 13 generates display picture in accordance with picture describe instruction sent from the processor 11 to send it to a display unit 21. The display unit 21 connected to the display controller 13 displays that picture on screen in accordance with display picture information sent from the display controller 13.

An input equipment interface 14 is adapted so that a keyboard 22 and a mouse 23 are connected thereto, and is operative to transfer, to the processor 11, input signal from the keyboard 22 or the mouse 23.

A network interface 15 is connected to LAN (Local Area Network) and controls data communication through the LAN. Namely, the network interface 15 transfers, to other units on the LAN, data sent from the processor 11, and receives data sent through the LAN to deliver it to the processor 11.

A memory (storage) unit 24 such as hard disk unit, etc. is connected to a HDD (Hard Disk Drive) controller 16. The HDD controller 16 controls input/output of data to and from the memory unit 24 to which the HDD controller 16 is connected. In the memory unit 24, there are stored program of the operating system that the processor 11 should execute, and program prepared on the basis of object oriented concept (hereinafter simply referred to as "object"), etc.

In the processor 11 of such a system, object is executed as occasion demands. At this time, there are instances where the function that the operating system provides is used to carry out memory access. For example, there is the service in which system time that the operating system carries out management is sent back to object. By utilizing such a service, respective objects can acquire system times. In view of this, the embodiment of this invention will now be described by taking the example of acquisition service of system time in connection with the case where object carries out memory access by using service that the operating system provides.

Figure 5:
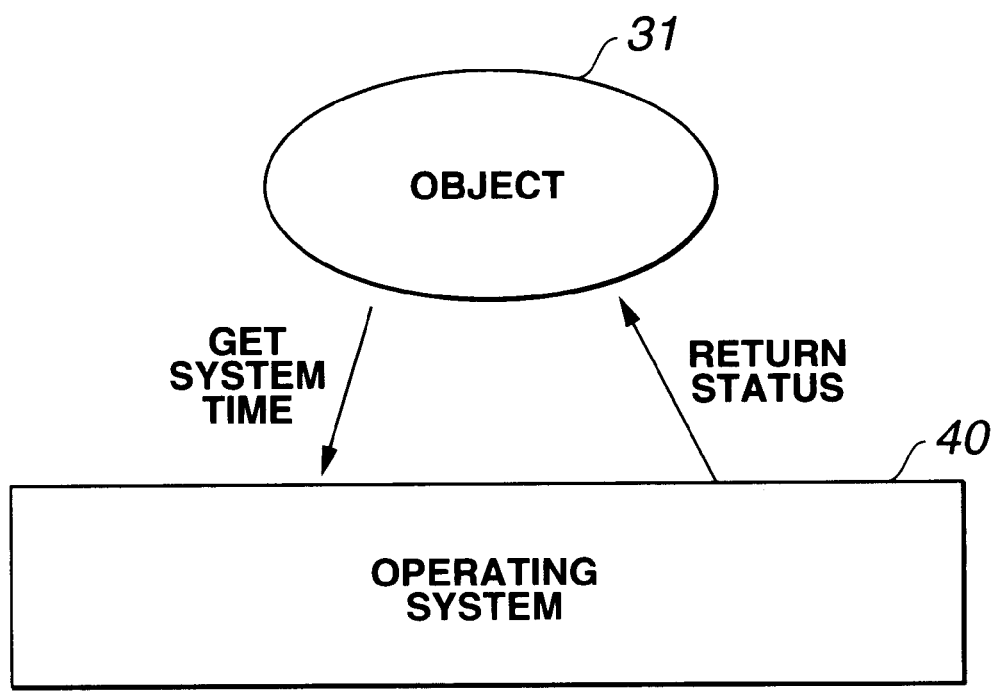
FIG. 5 is a block diagram for explaining the operation at the time of acquisition of system time.

FIG. 5 is a block diagram for explaining the operation at the time of acquisition of system time. Object 31 requests the operating system 40 to obtain system time by using GetSystemTimeAPI. At this time, the object 31 delivers, to the operating system 40, address of location in which result of system time is stored as argument to GetSystemTimeAPI. When address given by argument is valid, the operating system 40 stores system time into location indicated by the address, and sends SUCCESS as status (return Status) back to the object 31. In addition, the operating system 40 does not store system time when the address is invalid and sends FAIL back to object 31 as status.

The configuration of the operating system 40 will now be described.

Figure 6:
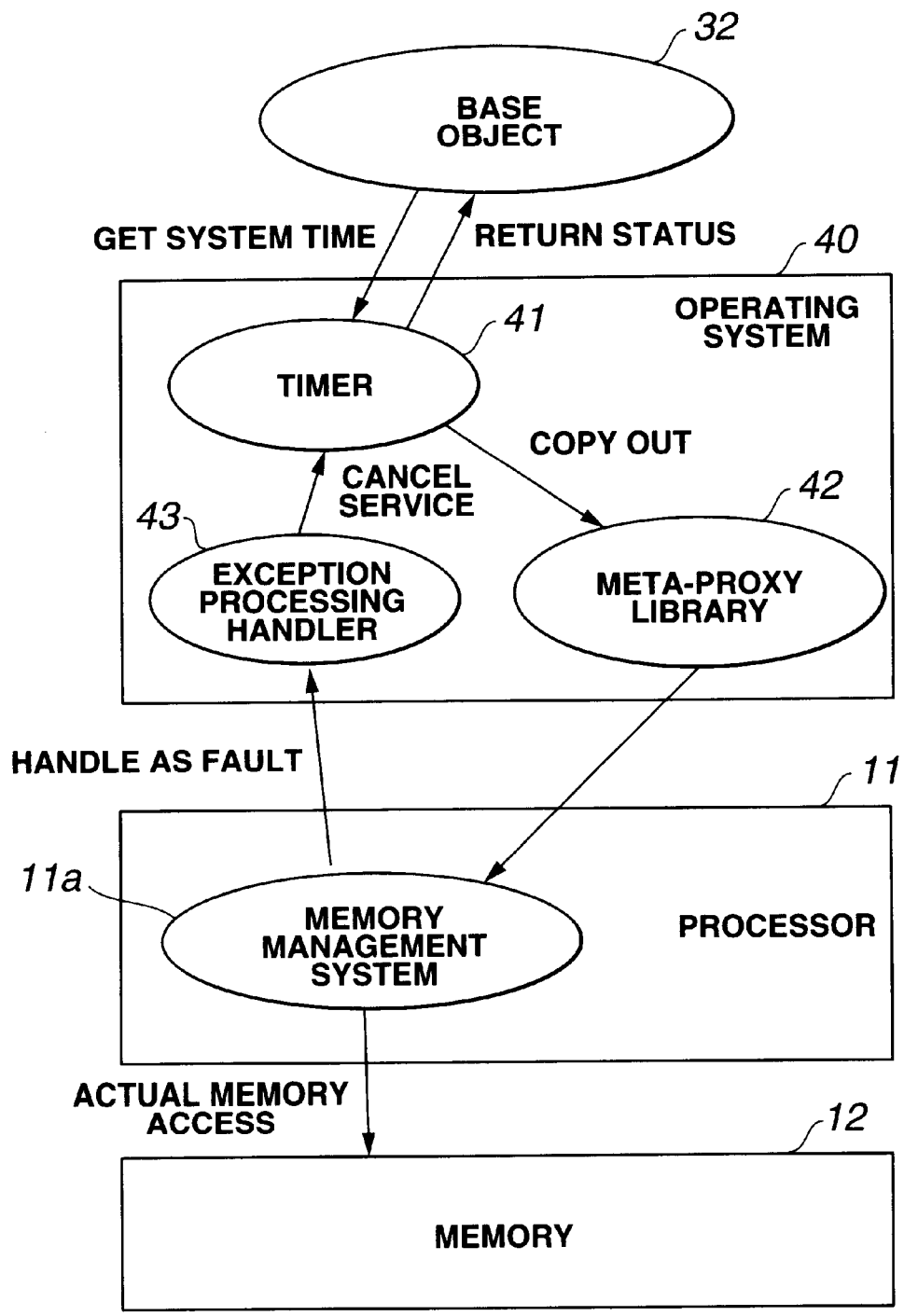
FIG. 6 is a block diagram showing correlation between respective objects constituting operating system.

FIG. 6 is a block diagram showing correlation between respective objects constituting the operating system. In this embodiment, the operating system 40 is constructed by program of object oriented type. In the following description, "meta-object" is object for providing service as operating system with respect to, e.g., other object like timer, and "base object" is object constituting application program and indicates object which requires, e.g., service by timer.

The timer (Timer) 41 which is meta-object carries out management of system time within the operating system 40. The timer 41 is adapted to receive message as shown in the Table 1.

TABLE 1

Method of Timer Object

| Input Message | Method | Output Message |
|---|---|---|
| GetSystemTime | 1. Acquisition of System Time<br>2. Calling of Copyout Function of Meta Proxy Lib<br>3. Sending Back of SUCCESS | Sending Back of Status |
| CancelService | 1. Sending Back of FAIL | Sending Back of Status |

The timer 41 stores system time into designated address in the message by GetSystemTime message sent from the base object 32. At this time, without carrying out checking of validity of address designated in the message, Copyout function located within meta-proxy library (MetaProxyLib) 42 is called. As argument with respect to the Copyout function, address designated in the message is caused to be copy destination address, system time is caused to be copy source data, and size (magnitude) of system time is caused to be copy size. Simultaneously therewith, the timer 41 delivers, to the processor 11, memory protection information of base object 32 and read right with respect to data of the timer 41. After the processing of the Copyout function has been completed, the timer 41 sends SUCCESS as status back to base object 32. In addition, the timer 41 executes method in accordance with CancelService message sent from exception processing handler (ExceptionHandler) 43. In this method, the timer 41 sends FAIL as status back to base object 32.

Meta-proxy library 42 can be called from all meta-objects. Moreover, meta-proxy library 42 is disposed (assigned) at specific address, and exception processing handler 43 knows in advance that address. Copyout function included in meta-proxy library 42 sets memory protection information delivered as argument at the time of calling at memory management system 11a of the processor 11 as shown in the Table 2.

TABLE 2

Function of Meta Proxy Lib

| Function | Method | Output Message |
|---|---|---|
| Copyout | 1. Setting of Memory Protective Information<br>2. Copy of Data<br>3. Return of Memory Protective Information | |

Copyout function of the meta-proxy library 42 is called from timer 41 during GetSystemTime message processing. The Copyout function sets memory protection information designated at the time of calling at memory management system 11a of the processor 11 thereafter to make copy of data corresponding to copy size, to the copy destination, from the copy source data. The Copyout function finally returns memory protection information to information before this function is called.

The exception processing handler 43 which is meta-object carries out processing of exception that the processor 11 generates within the operating system 40. The exception processing handler 43 is adapted as shown in the Table 3 so that when exception takes place in the processor 11, HandleAsFault message is sent and the method is executed in accordance therewith.

TABLE 3

Method of ExceptionHandler Object

| Input Message | Method | Output Message |
|---|---|---|
| HandleAsFault | 1. Analysis of Exception | CancelService |

In this method, the exception processing handler 43 analyses exception notified from the processor 11 to specify object in which exception is caused to take place. The exception processing handler 43 examines whether or not value of program counter when exception is caused to take place in the case where exception delivered by HandleAsFault message is address exception is within address in which meta-proxy library 42 is disposed or assigned. If so, CancelService message is sent to object in which exception is caused to take place, i.e., timer 41.

The processor 11 has memory management system 11a. The memory management system 11a is hardware existing within general processor, and has functions of conversion from logical address to physical address and protection of memory, etc. Since the conversion function from logical address to physical address is not directly related to this invention, explanation will be omitted. The memory protection function is the content as described below.

The memory management system 11a carries out check as to whether or not address that object makes reference to at the time of execution infringes memory protection information currently set at the memory management system 11a. If there is no infringement, access to actual memory 12 is provided. The memory management system 11a is adapted so that when there is any infringement, it does not carry out memory access to notify, to the operating system 40, address exception as HandleAsFault message. As memory protection information, there are write right, execution right and read right, etc. The write right indicates whether or not object has the right to write data into corresponding memory page, the execution right indicates whether or not object has the right to execute, as instruction train, data of corresponding memory page, and the read right indicates whether or not object has the right to read data of corresponding memory page.

The operation in the case where inquiry of system time is made from the base object 32 will now be described.

First, explanation will be given in connection with scenario in the case where base object 32 designates valid address to which reference can be made with respect to GetSystemTimeAPI when base object 32 obtains system time.

Figure 7:
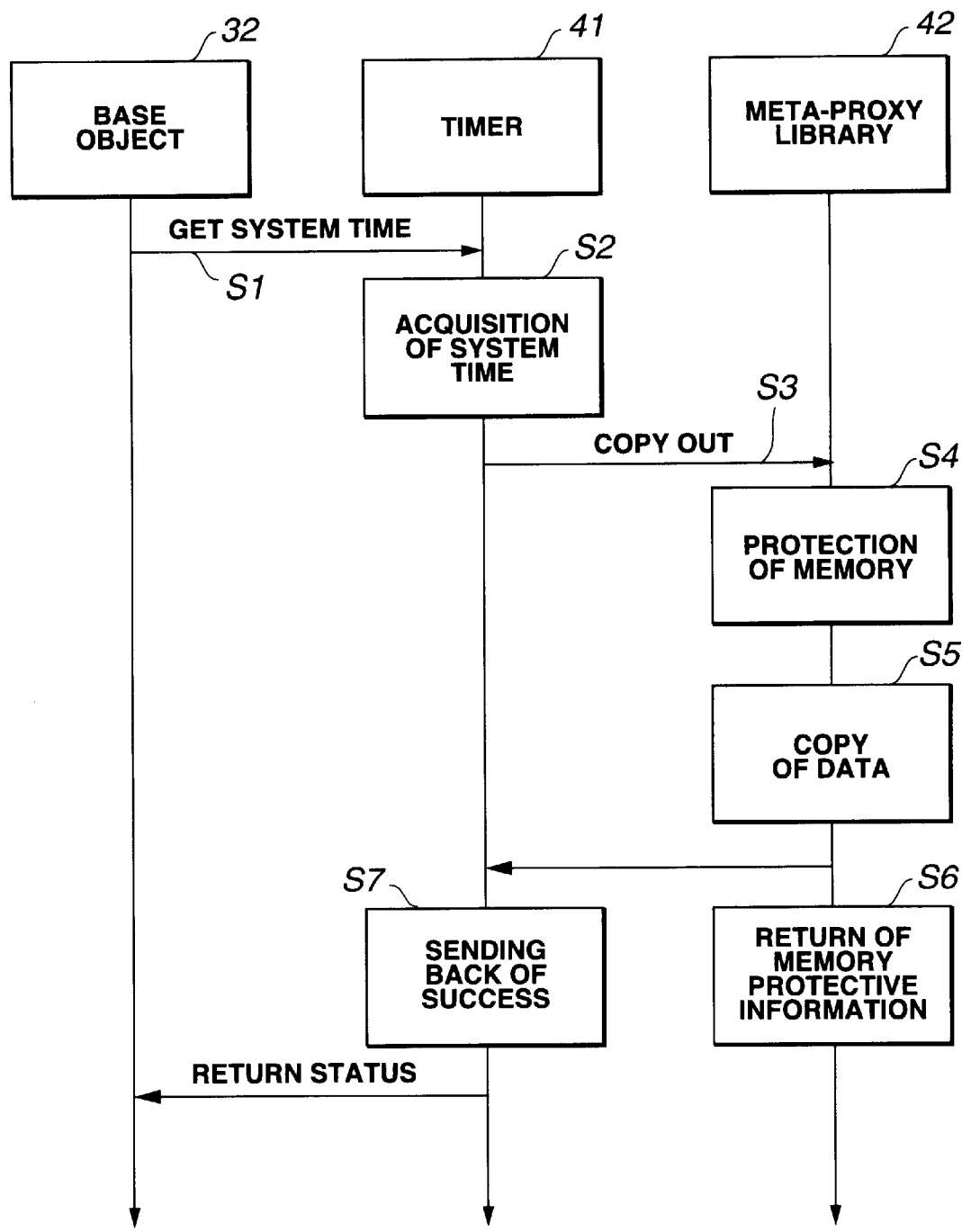
FIG. 7 is a flowchart showing processing at the time when designated address is valid.

FIG. 7 is a flowchart showing processing at the tone when designated address is valid. This is procedure of processing when the base object 32 uses GetSystemTimeAPI.

The base object 32 sends GetSystemTime message to the operating system 40 (step S1). At this time, context switch takes place from base object 32 to timer 41 which is meta-object of "Timer". Namely, the content of register of processor 11 that base object uses is preserved or stored at another location or place, and memory protection information, processor right level and interruption level that the timer 41 has are set at the register of the processor 11.

When the timer 41 receives GetSystemTime message, it acquires time of the system from data structure or device that the timer 41 itself carries out management (step S2). Then, the timer 41 calls Copyout function of meta-proxy library 42 (step S3). At this time, context switch is not carried out because of function calling.

The Copyout function of the meta-proxy library 42 sets, at memory management system 11a of the processor 11, memory protective information of base object 32 delivered as argument from the timer 41 and the read right with respect to data of the timer 41 (step S4). For this reason, although execution is being made at the context of the timer 41 which is meta-object during execution of Copyout function, the memory protective information and the read right of base object 32 are used with respect to memory protection.

Thereafter, the Copyout function copies data corresponding to copy size from copy source data designated by argument from the timer 41 to copy destination (step S5). Thus, system time is copied into address designated by base object 32.

Finally, the Copyout function returns to that of the original meta-object (step S6). Thus, execution of the Copyout function is completed. The processing returns to timer 41.

When execution of the Copyout function is completed, the timer 41 sends status of SUCCESS back to base object 32 (step S7). At this time, context of the base object 32 which has been preserved is returned. Since status of GetSystemTimeAPI is SUCCESS, base object 32 provides access to address designated at GetSystemTime. Thus, system time can be obtained.

The processing procedure in the case where suitable (reasonable) address is designated has been described above.

Scenario in the case where there is inaccurately designated address within the operating system to which reference cannot be made from base object at GetSystemTimeAPI when the base object obtains system time will now be described.

Figure 8:
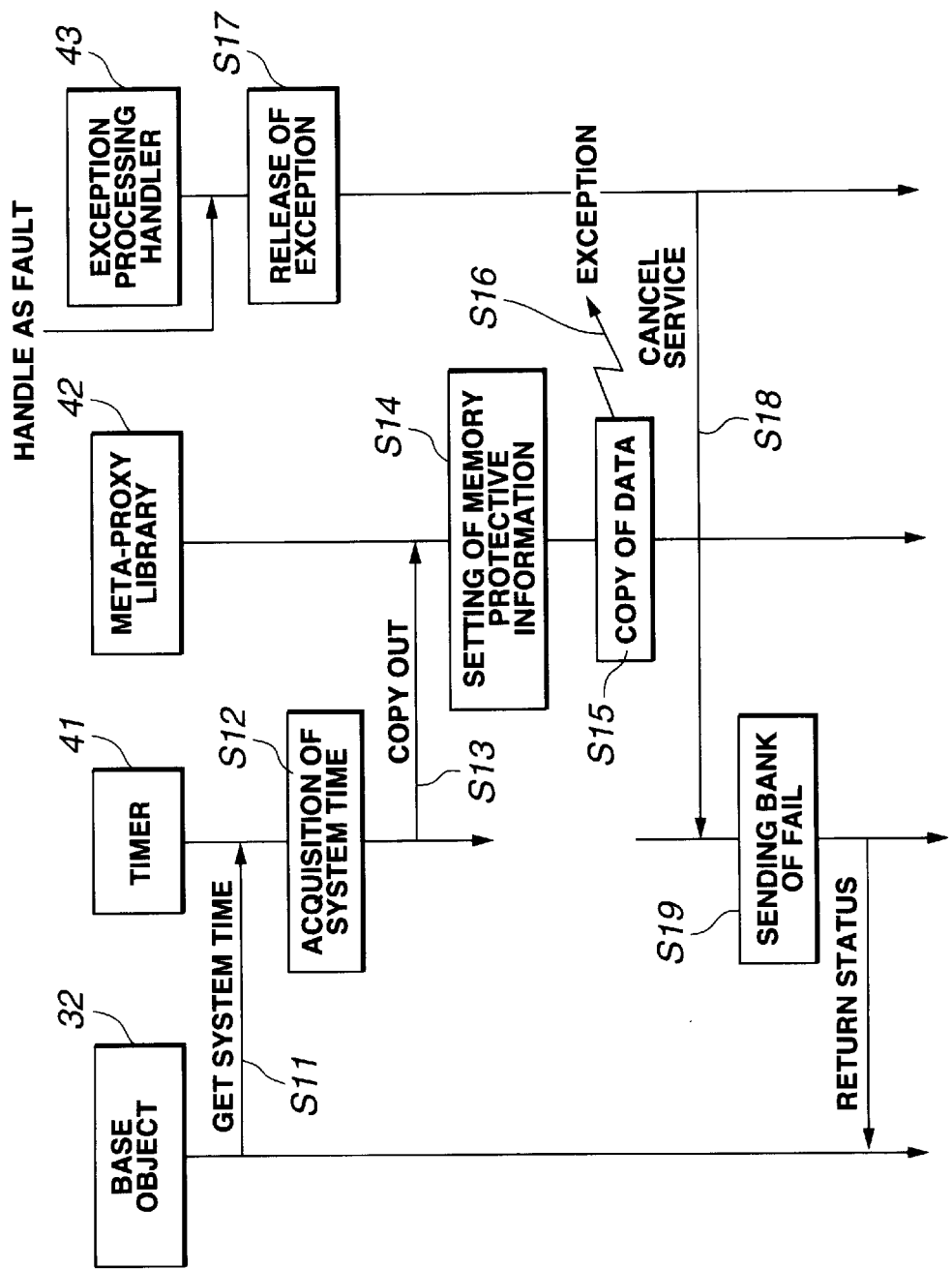
FIG. 8 is a flowchart showing processing at the time when designated address is invalid.

FIG. 8 is a flowchart showing processing at the time when designated address is invalid (inaccurate). This is the procedure of processing when base object 32 uses GetSystemTimeAPI.

Base object 32 sends GetSystemTime message (step S11). At this time, there takes place context switch from base object 32 to timer 41 which is meta-object.

The timer 41 which has received GetSystemTime message acquires time of the system from data structure and device that the timer 41 itself carries out management (step S12) to call Copyout function of meta-proxy library 42 (step S13). At this time, context switch is not carried out because of function calling. The Copyout function of the meta-proxy library 42 sets, at memory management system 11a of the processor 11, memory protective information of base object 32 delivered as argument and read right with respect to data of timer 41 (step S14). For this reason, although execution is being made at context of the timer 41 which is meta-object during execution of the Copyout function, memory protection information and read right of base object 32 are used with respect to memory protection.

The procedure until now is similar to that of scenario at the time when address is valid. Thereafter, the Copyout function copies data corresponding to copy size from copy source data designated by argument to copy destination (step S15). At this time, address designated as copy destination designates the internal location of the operating system 40 to which reference cannot be made from base object 32, and the memory management system 11a which is executing the Copyout function has only memory protection information of base object 32. For this reason, when the Copyout function executes write operation, the memory management system 11a generates exception (step S16). When exception processing handler 43 receives HandleAsFault indicating occurrence of exception, it analyses the content of the exception (step S17). In the case where exception is address exception and value of program counter when exception takes place is within address where meta-proxy library 42 is disposed (assigned), the exception processing handler 43 sends CancelService message to object where exception takes place (step S18).

At this time, context being executed relating to the timer 41 is cancelled because of occurrence of exception, and is executed as new context. For this reason, memory protection of the timer 41 is returned to primary one. Further, the timer 41 sends status of FAIL back to base object 32 (step S19). In this case, context of the base object 32 which has been preserved is returned. As a result, the base object 32 receives status of FAIL because it designates invalid (inaccurate) address for GetSystemTimeAPI.

As stated above, in this embodiment, as address operation module to directly handle address delivered from base object 32, meta-proxy library 42 is disposed (assigned) at specific address position. Moreover, at the time of execution of meta-proxy library 42, context switch is not carried out, but only memory protection information is switched into that of base object 32. For this reason, there is no necessity of carrying out address collation at operating system 40 as in the prior art. In the case where valid address is delivered, lowering of execution speed of calling operation of the meta-proxy library 42 is held down to lower value. As a result, the processing can be executed at higher speed. In this example, since valid address is assumed to be delivered in ordinary processing, lowering of execution speed is limited to the case where invalid address is designated.

Meanwhile, in this embodiment, since context switch is not carried out at the time of calling function of meta-proxy library 42, it is impossible to judge, from the context, whether timer 41 generates exception by the cause of the timer 41 itself or exception takes place by the cause of address delivered from base object 32. However, such an approach is employed to dispose (assign) meta-proxy library 42 at specific address, whereby when exception takes place, exception processing handler 43 for processing such an exception can discriminate that exception has taken place during execution of meta-proxy library 42 by value of the program counter.

Moreover, since memory management system 11a only has memory protection information of base object 32 and read right with respect to data of timer 41 at the time of execution of meta-proxy library 42, if attempt is made to carry out operation exceeding above within the meta-proxy library 42, address exception takes place. As the result of the fact that the timer 41 processes CancelService message from the exception processing handler 43, it is possible to suitably carry out error processing in the case where invalid address is designated.

In this example, the processing contents of functions that the above-described respective objects and the operating system have are described in program recorded with respect to the computer readable recording medium. Further, by executing such program by the computer, the above-described processing is realized by the computer. As the computer readable recording medium, there are magnetic recording unit and semiconductor memory, etc. In the case where such recording media may be circulated on the market, program is stored at portable recording medium such as CD-ROM (Compact Disk Read Only Memory) or floppy disc, etc. and is circulated, or program may be stored in memory unit of computer connected through network to transfer data corresponding to such program to other computers through the network. In executing such program by computer, program is stored with respect to hard disc unit, etc. within the computer to load such program into main memory to execute it.

Figure 9:
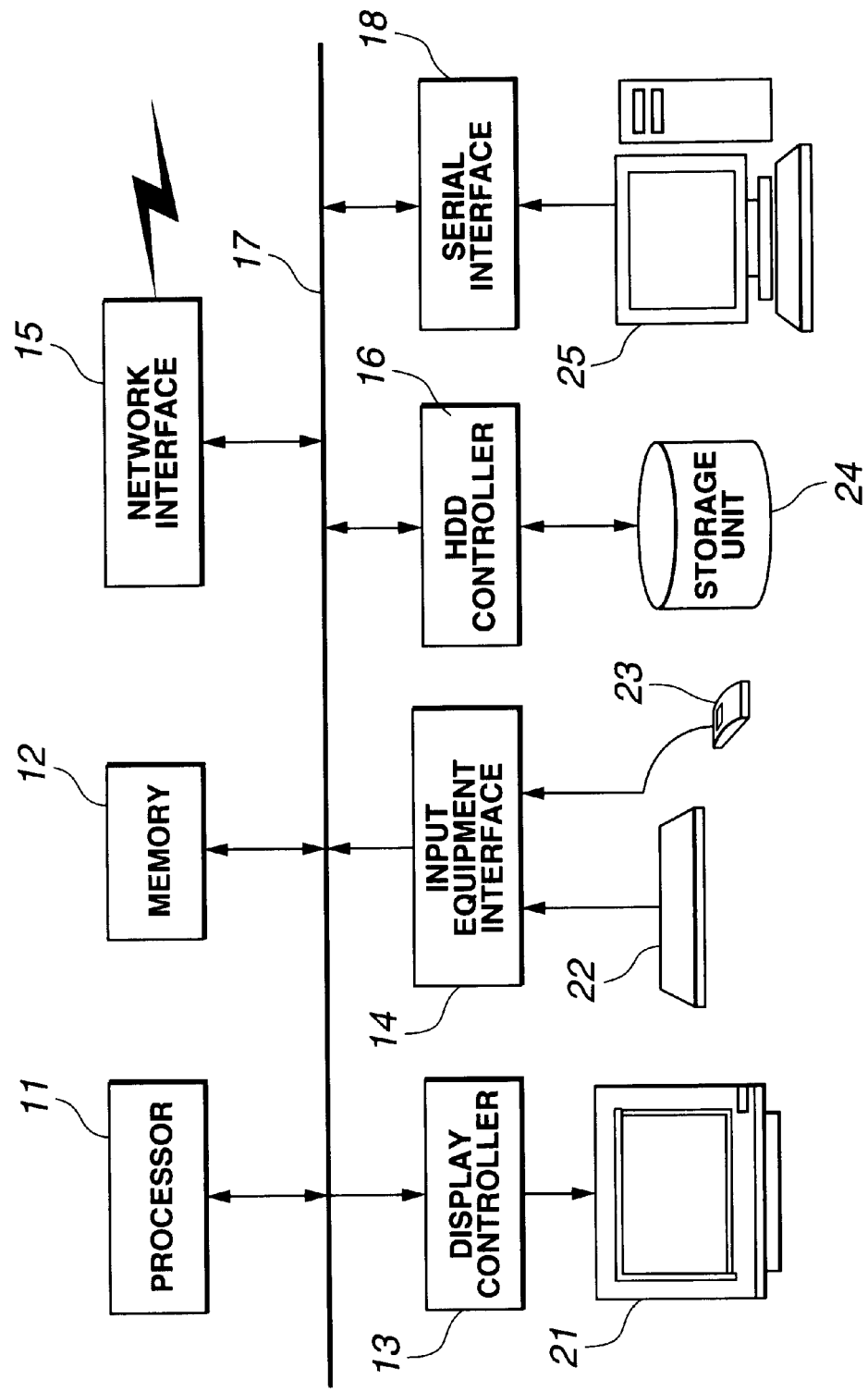
FIG. 9 is a block diagram showing hardware configuration of computer for carrying out this invention.

Another embodiment of this invention will now be described. FIG. 9 is a block diagram showing hardware configuration of computer for this embodiment. The same reference numerals are respectively attached to the same components as the components shown in FIG. 4, and repetitive explanation will be omitted.

A host computer 25 such as personal computer, etc. is connected to a serial interface 18. On the host computer 25, there is operative host debugger for debugging program operative on computer composed of processor 11 to HDD controller 16, etc. (hereinafter referred to as system). The host debugger can obtain information necessary for debug from operating system of this system via the serial interface 18.

User operates host debugger operative on the host computer 25 to debug program operative on this system. At that time, there are instances where functions that the operating system provides are used to carry out memory access. For example, there are instances where user is desired to make reference to value of variable used in the program. There is the case where it is desired that reference is made to value of variable P which is void*type of C++ language. In this case, value of the variable P is address. However, reference is made not only to value of that address but also to value of character string placed (assigned) at the address indicated by P. Value of character string can be acquired by utilizing service that the operating system provides for debug. In view of this, explanation will be described in connection with this embodiment by taking the example of the case where host debugger displays value of variable by making use of service that the operating system provides.

Figure 10:
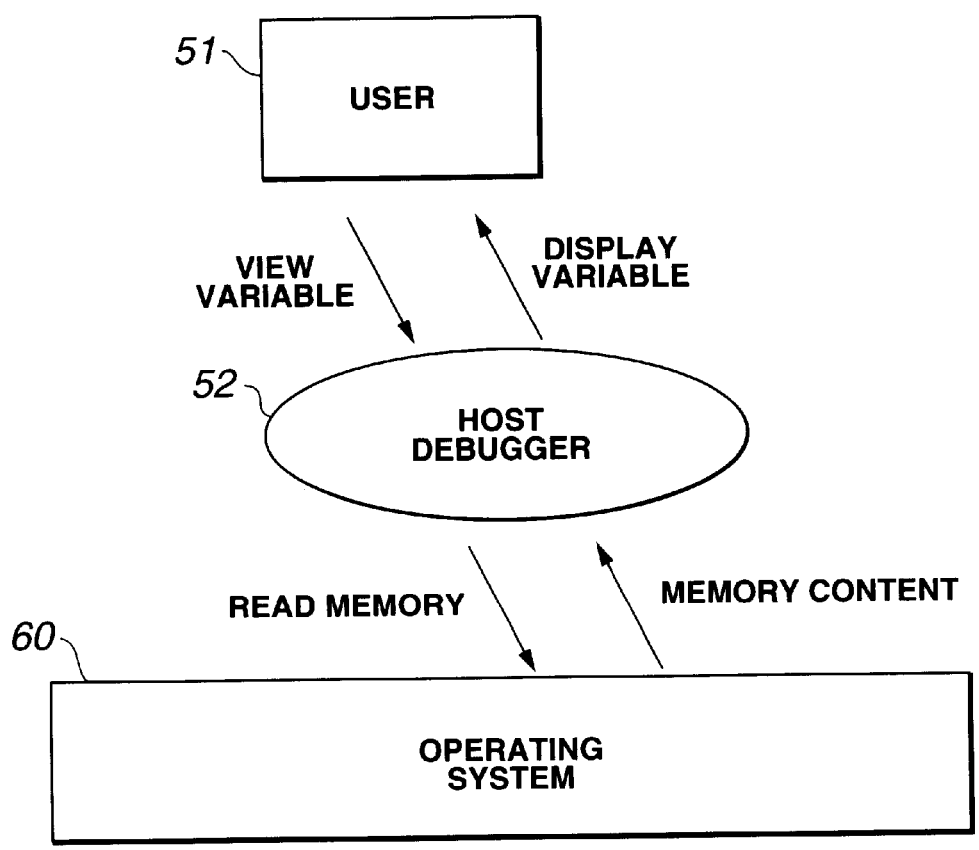
FIG. 10 is a block diagram for explaining operation in the case where host debugger carries out display of value of variable.

FIG. 10 is a block diagram for explaining operation in the case where the host debugger carries out display of value of variable. User 51 operates host debugger 52 operative on the host computer 25 to request the host debugger 52 to carry out display of value P of variable (view variable). At this time, information of variable of which value should be displayed is delivered to view variable. The host debugger 52 determines address of variable from information of symbol table, etc. of program to be debugged to request operating system 60 to deliver memory content of that address by using ReadMemory. At this time, the host debugger 52 delivers, to the operating system 60, address to memory as argument to ReadMemory. When address given by argument is valid, the operating system 60 sends content of memory and SUCCESS as status back to the host debugger 52. In addition, when address is invalid, the operating system 60 sends FAIL as status back to host debugger 52 without sending back the content of the memory.

The configuration of the operating system 60 will now be described.

Figure 11:
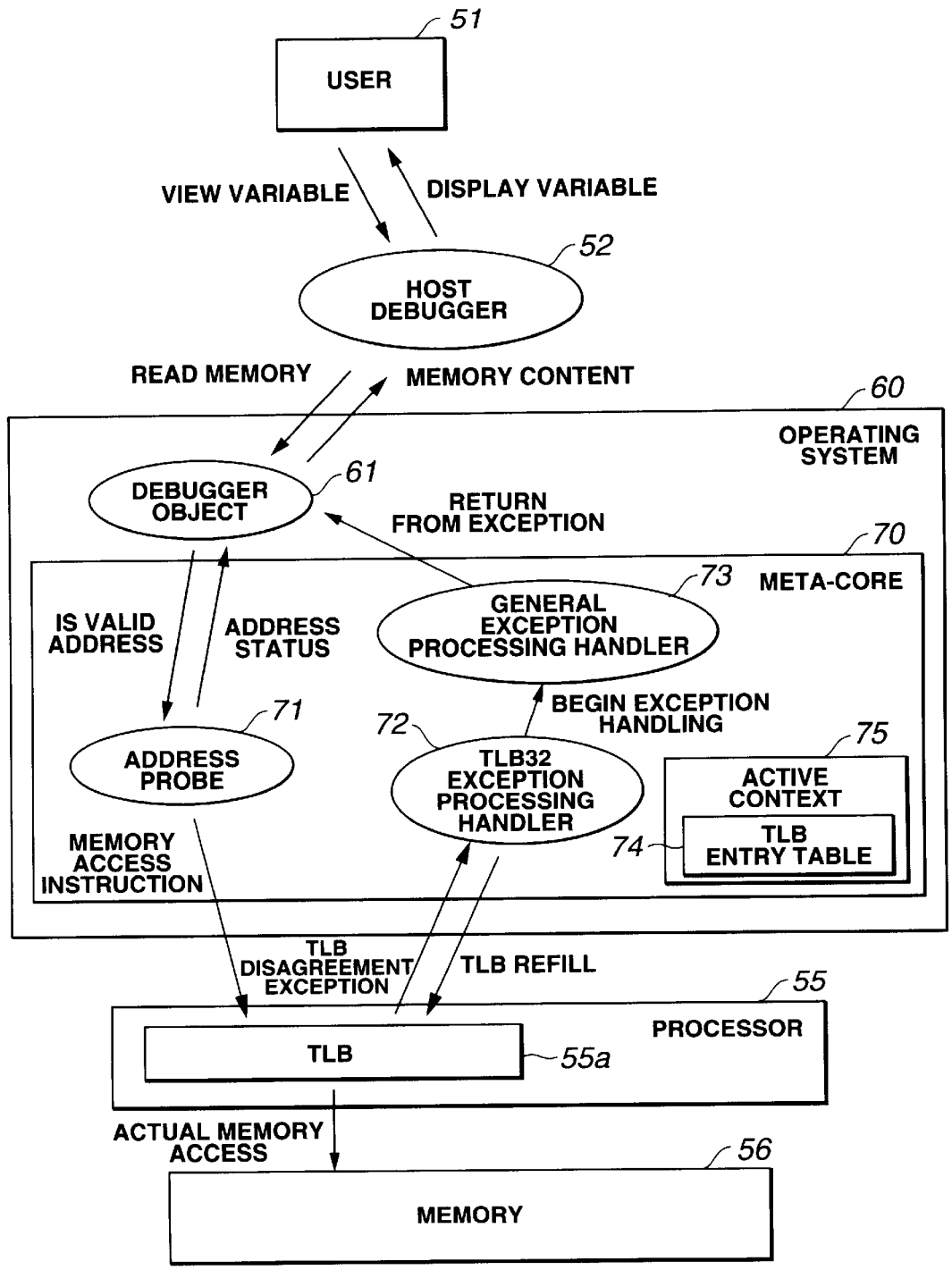
FIG. 11 is a block diagram showing correlation between objects or functions constituting the operating system.

FIG. 11 is a block diagram showing correlation between objects or functions constituting the operating system. In this embodiment, the operating system 60 is constructed by plural parallel objects and meta-core (MetaCore) 70 for abstracting processing of processor. Further, the meta-core 70 is constituted by function modules of address probe (AddressProbe) 71, TLB 32 exception processing handler (TLB32ExceptionHandler) 72, and general exception processing handler (GeneralExceptionHandler) 73.

Moreover, in this embodiment, processor 55 has TLB (Translation Lookaside Buffer) 55a as memory management means. When the processor 55 receives memory access instruction, it carries out check of protective attribute of address to be accessed and conversion into physical address by collating it with the TLB 55a. When there does not exist entry corresponding to address, the TLB 55a generates TLB disagreement exception with such address being argument.

Respective objects are adapted so that Contexts corresponding thereto are assigned by operating system. The Context has TLB entry table (TLBEntryTable) as memory protection information. Further, Context of object being executed is set at active context (ActiveContext) 75 by meta-core 70. For this reason, memory protection information TLBEntryTable that Context has is also set at TLB entry table (TLBEntryTable) 74.

Debugger object (DebuggerObject) 61 provides debug support service in cooperation with host debugger 52 within the operating system 60. In the TLBEntryTable of Context corresponding to debugger object 61, there is included memory protection information of object to be debugged. In addition, at the time of execution of debugger object 61, Context corresponding to debugger object 61 is set at active context 75. For this reason, setting of memory protection information by memory access proxy (agent) means 2b shown in FIG. 3 becomes unnecessary. When the debugger object 61 receives ReadMemory message sent from the host debugger 52, check of validity of address designated in the message is carried out by calling IsValidAddress function of address probe 71 within the meta-core 70. When AddressStatus is true after debugger object 61 calls IsValidAddress function, it sends the content of address designated by ReadMemory back to the host debugger 52. On the other hand, when AddressStatus is false, the debugger object 61 sends error back to the host debugger 52.

The address probe 71 carries out check of validity of address within the operating system 60. In the IsValidAddress function, after return standby (preparation) for sending back error is carried out at the time of occurrence of exception, access is provided to memory of address designated as argument. Thereafter, true indicating that address is valid is sent back as AddressStatus.

TLB 32 exception processing handler 72 processes TLB disagreement exception from the processor 55 within the operating system 60. When the TLB32 exception processing handler 72 receives TLB disagreement exception, it retrieves TLB entry table 74 within active context 75 to obtain TLB entry corresponding to address delivered as argument of TLB disagreement exception. The TLB 32 exception processing handler 72 is adapted so that when TLB entry is found, it erases unnecessary entry from TLB 55a of the processor 55 to instead register, at the TLB 55a, TLB entry found as the result of the fact that TLB entry table 74 is retrieved to return from exception. In addition, the TLB 32 exception processing handler 72 is adapted so that when no TLB entry is found, it calls BeginExceptionHandling of general exception processing handler 73 with the value of program counter indicating program execution position at the time of occurrence of exception being as argument.

The general exception processing handler 73 processes the entirety of exception processing within the operating system 60. When BeginExceptionHandling is called, the general exception processing handler 73 checks whether or not the value of program counter delivered as argument falls within the program range of the address probe 71, whereby when the value of the program counter falls within the range, return of exception is carried out. On the other hand, when the value of the program counter does not fall within the range, the general exception processing handler 73 carries out ordinary exception processing.

Figure 12:
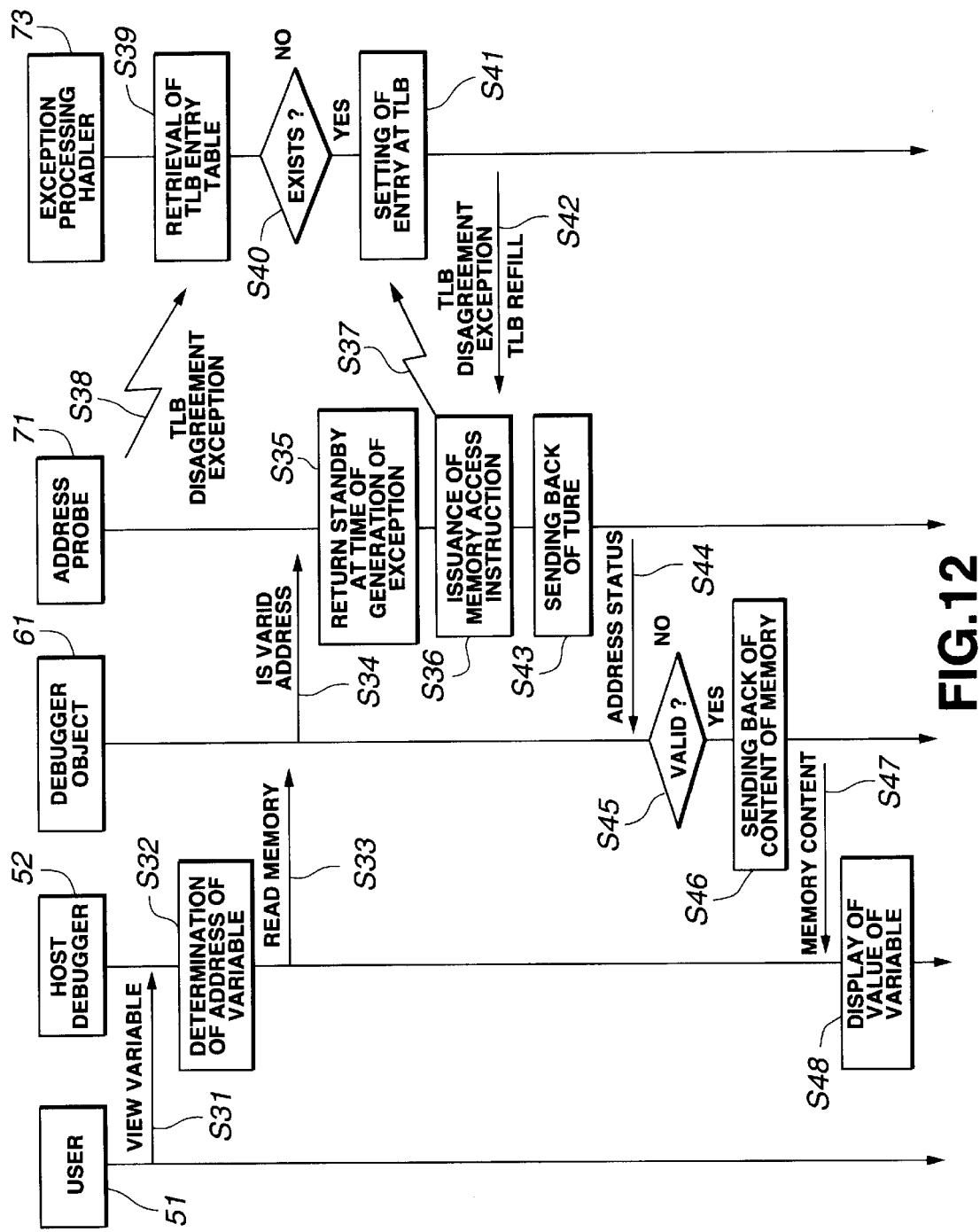
FIG. 12 is a flowchart showing processing in the case where address is within valid range when user operates variable display on the host debugger.

FIG. 12 is a flowchart showing the processing in the case where when user 51 operates variable display (indication) on the host debugger 52, that address falls within the valid range. When user 51 requests display of variable, view variable is sent to host debugger 52 (step S31). At this time, information of variable of which value is to be displayed is included in view variable.

The host debugger 52 determines address of variable from information of variable delivered as argument and information of symbol table of program to be debugged, etc. (step S32) to send ReadMemory message to debugger object 61 with this address being as argument (step S33).

The debugger object 61 calls IsValidAddress function of address probe 71 with address delivered as argument of ReadMemory message being as argument to thereby check validity of address (step S34) IsValidAddress function of address probe 71 is called as function from debugger object 61. Moreover, the debugger object 61 has also memory protection information of program to be debugged at memory protection information EntryTable of its Context. Further, during execution of debugger object 61, EntryTable of debugger object 61 is set at TLB entry table 74 within active context 75 shown in FIG. 11. For this reason, the address probe 71 becomes operative by using memory protection information of program to be debugged. Namely, the address probe 71 carries out standby (preparation) so that false is sent back to calling source of the address probe 71 as AddressStatus at the time of generation of exception (step S35). Then, the address probe 71 executes instruction to provide access to address delivered as argument (step S36). At this time, the processing is branched in dependency upon whether or not entry corresponding to the accessed address is at TLB 55a within the processor 55 of FIG. 11. When entry corresponding to the accessed address is not at TLB55a within processor 55 of FIG. 11, TLB disagreement exception takes place with the accessed address being as argument (step S37).

When the TLB32 exception processing handler 72 receives TLB disagreement exception (step S38), it retrieves TLB entry table 74 of FIG. 11 (step S39) to obtain entry of TLB corresponding to address delivered as argument of TLB disagreement exception. In the case of this processing, since address to be accessed falls within the valid range, corresponding TLB entry can be found (step S40). The TLB32 exception processing handler 72 erases unnecessary entry from TLB55a of the processor 55 of FIG. 11 to instead register, at TLB55a, TLB entry found as the result of the fact that TLB entry table 74 is retrieved (step S41) to return from exception (step S42).

When exception is returned, processing is restarted (resumed) from instruction to provide access to address delivered as argument of IsValidAddress function at step S36 of the address probe 71. At this time, since entry corresponding to accessed address exists at TLB 55a of FIG. 11 by execution of TLB32 exception processing handler 72, access succeeds in turn. When entry corresponding to accessed address already exists at TLB55a of FIG. 11 at step S36, processing until return of exception of step S42 from TLB disagreement exception of step S37 are not carried out. Then, the address probe 71 sets true as AddressStatus (step S43) to send AddressStatus back to debugger object 61 (step S44).

When AddresStatus is true as the result of calling of IsValidAddress function (step S45), the debugger object 61 obtains the content of memory indicated by address designated by argument of ReadMemory (step S46) to send the content of this memory and status caused to be SUCCESS back to the host debugger 52 (step S48).

When status sent back as the result of calling of ReadMemory is SUCCESS, the host debugger 52 displays the content of the memory on the screen of the host computer 25 (step S48).

Figure 13:
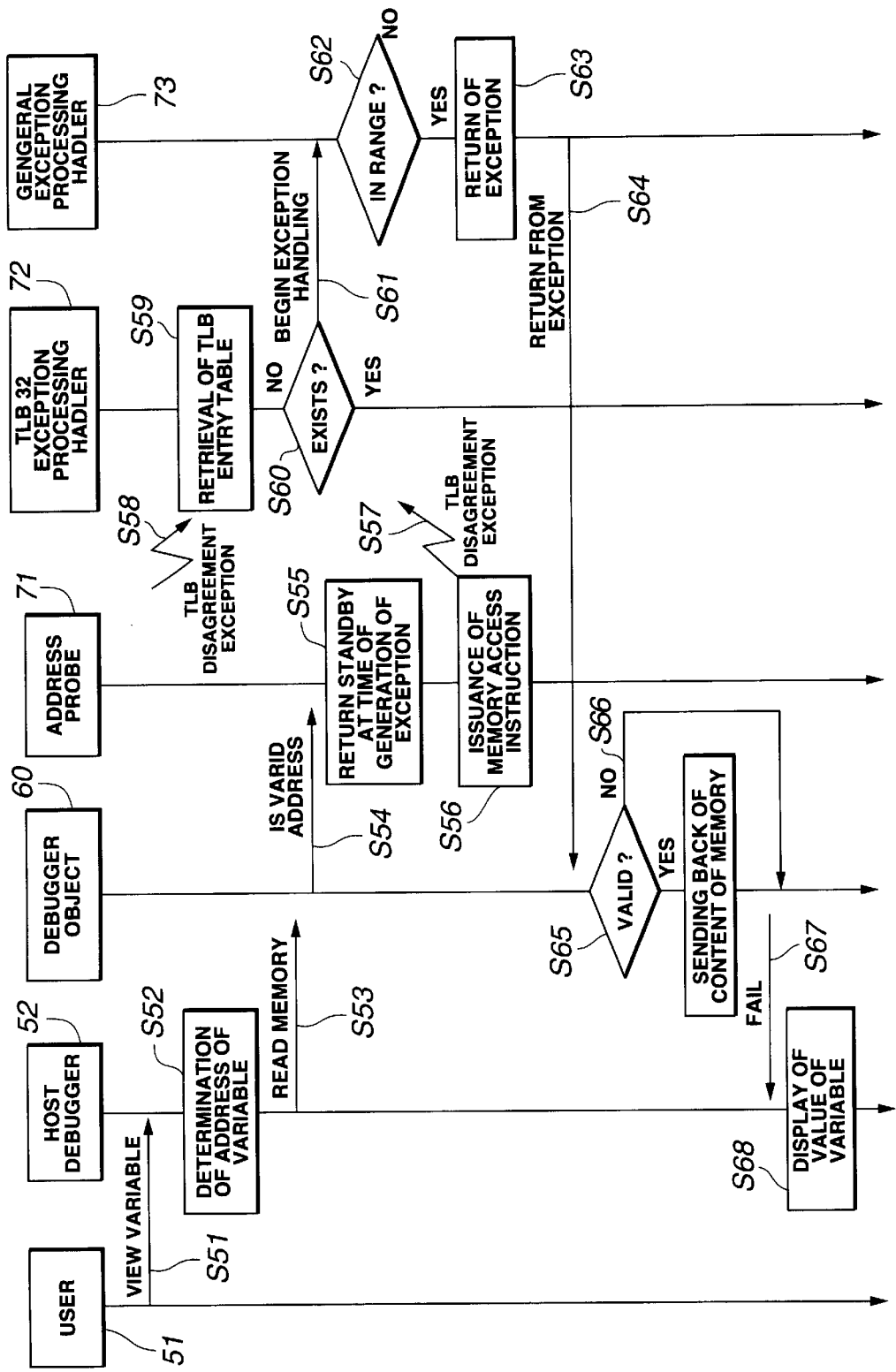
FIG. 13 is a flowchart showing processing in the case where address is not within valid range when user operates variable display on the host debugger.

FIG. 13 is a flowchart showing processing in the case where when user 51 operates a variable display on the host debugger 52, that address does not fall within the valid range.

Processing of steps S51 to S55 are the same as the processing of the steps S31 to S35 of FIG. 12. In the case of this processing, access to address delivered as argument of IsValidAddress function is carried out at step 56, but entry corresponding to this address does not necessarily exist at TLB55a within the processor 55 of FIG. 11. For this reason, processing of steps S57 to S59 are carried out similarly to processing of steps S37 to S39 of FIG. 12. Since address to be accessed does not fall within the valid range at step S60, entry of corresponding TLB cannot be found. For this reason, at step S61, BeginExceptionHandling of general exception processing handler 73 is called with the value of program counter indicating program execution position at the time of occurrence of exception being as argument.

The general exception processing handler 73 checks whether or not the value of the program counter delivered as argument falls within the program range of address probe 71 (step S62), whereby when the value of the program counter falls within the range, return of exception is carried out (step S63). On the other hand, when the value of the program counter does not fall within the range, the general exception processing handler 73 carries out ordinary exception processing (step S63). In the case of the ordinary processing, since the value of the program counter falls within the program range of the address probe 71, return of exception is carried out. When return of exception is carried out, false is sent back to calling source of address probe 71, i.e., debugger object 61 by processing carried out at step S55 as AddressStatus.

When AddressStatus is false as the result of calling of IsValidAddress function (step S66), the debugger object 61 allows status to be FAIL to send it back to the host debugger 52 (step S67).

When status sent back as the result of calling of ReadMemory is FAIL, the host debugger 52 is operative to display, on the screen of the host computer 25, message indicating that value of variable is invalid (inaccurate) (step S68).

Figure 14:
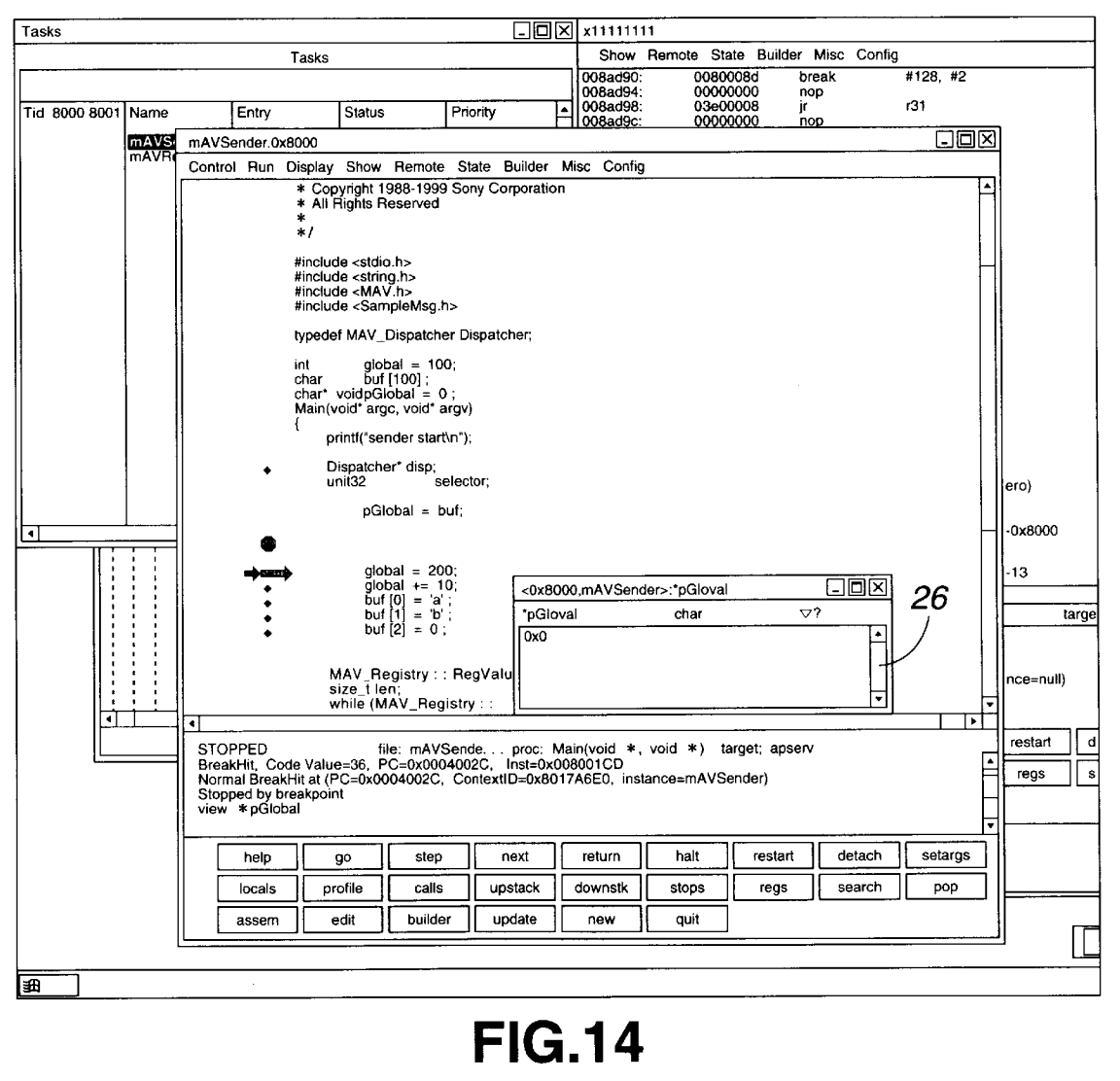
Figure 15:
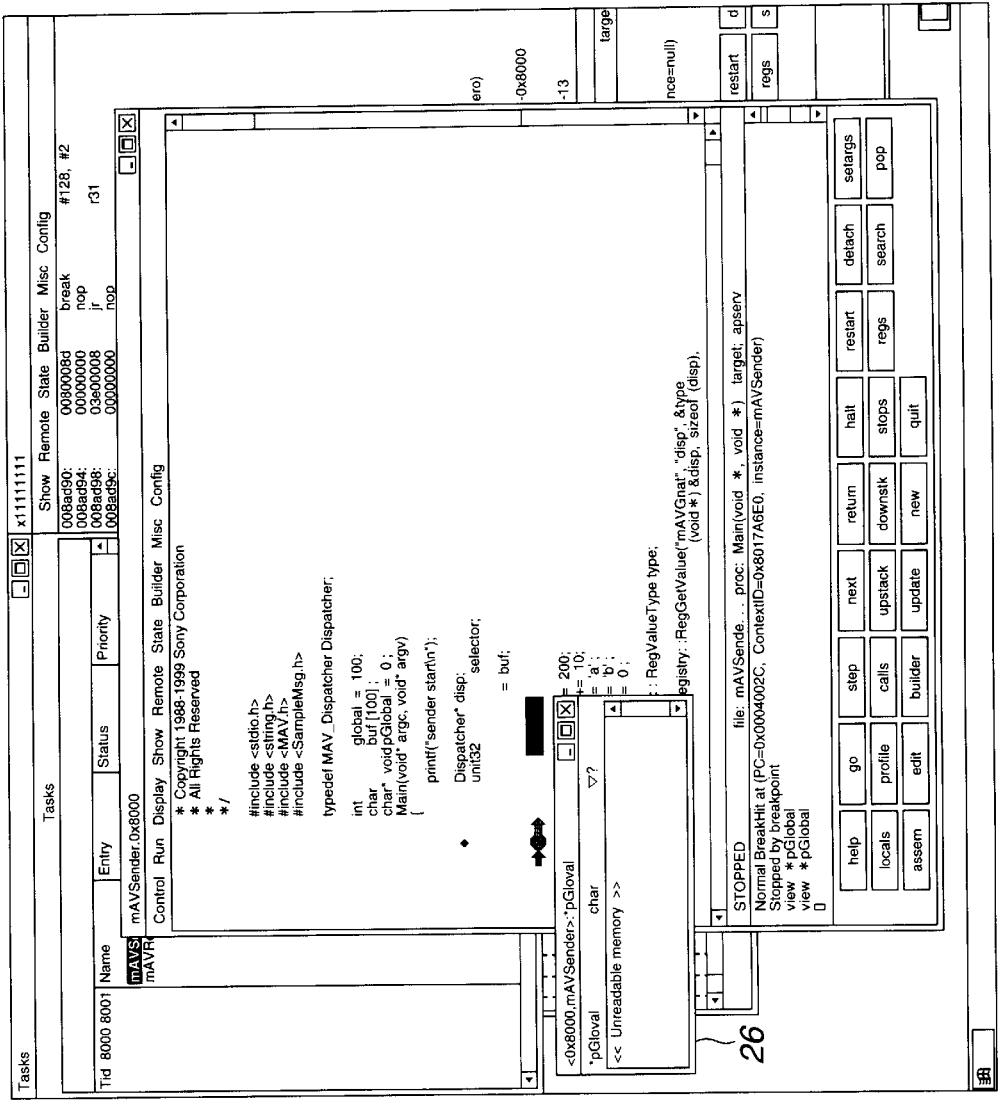
FIG. 15 is a view showing display picture of host debugger in the case where address is not within the valid range when user operates variable display on the host debugger.

FIGS. 14 and 15 are views showing result of debug displayed on the screen of the host computer 25. When address is within valid range as shown in FIG. 14, the content of the memory, e.g., "0×0" is displayed at result window 26 of picture on screen of the host computer 25. On the other hand, when address is not within the valid range as shown in FIG. 15, message indicating that value of variable is invalid (inaccurate), e.g., "Unreadable memory" is displayed within the result window 26.

Industrial Applicability

As described above, in the computer according to this invention, operation including memory access generated when the request processing means carries out processing is requested with respect to the memory access proxy (agent) means, and the memory access proxy means sets such a memory protection information that object which outputs first processing request can access with respect to accessible area thereafter to output memory access instruction to the processor. Thus, when valid address is delivered, memory protection can be carried out at higher speed. Since it is assumed in ordinary state that valid address is delivered, lowering of execution speed is limited to the case where invalid (inaccurate) address is designated. Thus, the entire effective speed can be improved.

Further, in the computer readable recording medium adapted so that address validity collation program is recorded according to this invention, computer is caused to execute recorded address validity collation program, whereby in the case where operation including memory access is generated when the request processing means carries out processing in accordance with processing request, there is set memory protection information such that object which has outputted processing request can access with respect to the accessible area thereafter to permit the computer to carry out such a processing to output memory access instruction to the processor. As a result, computer capable of executing, at high speed, high reliability memory access is constructed.

In addition, in the address validity collation method according to this invention, recorded address validity collation program is caused to be executed by computer, whereby in the case where when the request processing means carries out processing in accordance with processing request, operation including memory access is generated, memory protection information such that object which has outputted processing request can access with respect to the accessible area is set thereafter to output memory access instruction to the processor. For this reason, high reliability memory access can be carried out at high speed.

What is claimed is:

1. A memory access control system, comprising:
    request processing means for receiving, from an object, a processing request that includes a request to access memory at a designated address, and for executing processing in accordance with the processing request;
    memory access proxy means for receiving, from the request processing means, an agent-processing request corresponding to the processing request from the object, and in response thereto, setting memory protection information indicating a memory area that said object is allowed to access, and outputting a memory access instruction containing said memory protection information; wherein the memory access proxy means is a software program executed in a predetermined memory area; and
    memory management means for receiving said memory access instruction outputted by said memory access proxy means, and generating an exception with respect to the memory access instruction when said designated address provided by said object is not within the memory area indicated by said memory protection information, said exception being output to said request processing means.

2. The memory access control system as set forth in claim 1, wherein the memory management means is constituted within a processor.

3. The memory access control system as set forth in claim 1, wherein the memory access proxy means executes various processing on the context of the request processing means.

4. The memory access control system as set forth in claim 1, which further comprises exception processing means for executing exception processing in accordance with the exception generated by the memory management means.

5. The memory access control system as set forth in claim 1, wherein an exception processing means recognizes the exception during execution of the memory access proxy means on the basis of the fact that an address set at a program counter when the processing request is issued designates the inside of the memory area where the memory access proxy means is executed.

6. A memory access control method for use within a memory access control system, comprising the steps of:
    receiving, from an object, a processing request that includes a request to access memory at a designated address, and executing processing in accordance with the processing request, said processing including generating an agent-processing request corresponding to said processing request of said object;
    receiving, by a memory access agent, said agent processing request and in response thereto, setting memory protection information indicating a memory area that said object is allowed to access, and outputting a memory access instruction containing said memory protection information; wherein the memory access agent is a software program executed in a predetermined memory area; and
    receiving said memory access instruction outputted by said memory access agent, and generating an exception with respect to the memory access instruction when said designated address provided by said object is not within the memory area indicated by said memory protection information.

7. A computer readable record medium storing a program executable by a processor to perform the steps of:
    receiving, from an object, a processing request that includes a request to access memory at a designated address, and executing processing in accordance with the processing request, said processing including generating an agent-processing request corresponding to said processing request of said object;
    receiving, by a memory access agent, said agent processing request and in response thereto, setting memory protection information indicating a memory area that said object is allowed to access, and outputting a memory access instruction containing said memory protection information; wherein the memory access agent is a software program executed in a predetermined memory area; and
    receiving said memory access instruction outputted by said memory access agent, and generating an exception with respect to the memory access instruction when said designated address provided by said object is not within the memory area indicated by said memory protection information.

* * * * *